(12) United States Patent
Mercat

(10) Patent No.: US 8,037,967 B2
(45) Date of Patent: Oct. 18, 2011

(54) ACOUSTIC TREATMENT DEVICE FOR TURBINE AND COMBUSTION NOISES

(75) Inventor: Florent Mercat, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/523,059

(22) PCT Filed: Jan. 30, 2008

(86) PCT No.: PCT/EP2008/051130
§ 371 (c)(1),
(2), (4) Date: Jul. 14, 2009

(87) PCT Pub. No.: WO2008/095846
PCT Pub. Date: Aug. 14, 2008

(65) Prior Publication Data
US 2010/0012423 A1    Jan. 21, 2010

(30) Foreign Application Priority Data
Feb. 1, 2007   (FR) ..................... 07 53015

(51) Int. Cl.
*E04B 1/82*    (2006.01)
(52) U.S. Cl. .......... 181/292; 181/213; 244/1 N
(58) Field of Classification Search .......... 181/210, 181/213, 292; 244/1 N; 415/119
See application file for complete search history.

(56) References Cited

U.S. PATENT DOCUMENTS

| | | | |
|---|---|---|---|
| 3,948,346 A * | 4/1976 | Schindler | 181/286 |
| 4,064,961 A | 12/1977 | Tseo | |
| 4,235,303 A * | 11/1980 | Dhoore et al. | 181/214 |
| 4,240,519 A | 12/1980 | Wynosky | |
| 4,287,962 A * | 9/1981 | Ingard et al. | 181/224 |
| 5,106,668 A * | 4/1992 | Turner et al. | 428/116 |
| 5,912,442 A * | 6/1999 | Nye et al. | 181/292 |
| 5,997,985 A * | 12/1999 | Clarke et al. | 428/116 |
| 6,114,652 A * | 9/2000 | Clarke et al. | 219/121.71 |
| 7,331,421 B2 * | 2/2008 | Olsen et al. | 181/214 |
| 7,540,354 B2 * | 6/2009 | Morin et al. | 181/292 |
| 2004/0076512 A1 | 4/2004 | Lata Perez | |
| 2008/0179448 A1 * | 7/2008 | Layland et al. | 244/1 N |
| 2009/0045009 A1 * | 2/2009 | Chiou et al. | 181/290 |

FOREIGN PATENT DOCUMENTS
FR    2 818 421    6/2002

OTHER PUBLICATIONS

Jia Yu, et al., "Folding Cavity Acoustic Liner for Combustion Noise Reduction", 12th AIAA/CEAS Aeroacoustics Conference, May 8-10, 2006, XP002450867, pp. 1-10.

* cited by examiner

*Primary Examiner* — Forrest M Phillips
(74) *Attorney, Agent, or Firm* — Oblon, Spivak, McClelland, Maier & Neustadt, L.L.P.

(57) ABSTRACT

An acoustic treatment device for an internal primary ejection duct from a turbojet pod, including an upstream zone and a downstream zone relative to an airflow direction in the primary ejection duct, the upstream and downstream zones being located on each side of a separating wall with a first face on the side of the upstream side and a second face on the side of the downstream side. The separating wall is a micro-porous wall and the face of the separating wall located on the side of the downstream side is covered by a honeycomb structure to attenuate high frequency acoustic waves. Such a device may find application to treatment of combustion and turbine noises.

11 Claims, 1 Drawing Sheet

ACOUSTIC TREATMENT DEVICE FOR TURBINE AND COMBUSTION NOISES

TECHNICAL FIELD OF THE INVENTION AND PRIOR ART

The invention relates to an acoustic treatment device for turbine noise, and more particularly an acoustic treatment device for the internal structure of the primary ejection duct from turbojet pods, more commonly referred to as "plugs".

Two noise sources are predominant in the primary ejection ducts; high frequency turbine noise (frequencies of the order of 5000 Hz) and low frequency combustion noise (frequencies between 300 Hz and 1000 Hz).

Different types of acoustic treatment are known to attenuate noise that propagates in primary ejection ducts. A first type consists of placing thin cellular layers on the outside face of the plug to attenuate high frequency noise (turbine noise). Thicker layers (for example that may be about fifteen centimetres thick) have also been envisaged. These layers can then be used to attenuate frequencies of the order of 800 Hz. However, the available space in the plug does not allow thicker treatments to attenuate lower frequency noise.

Another known treatment for high frequency noise consists of combining cellular layers, for example honeycomb layers, as disclosed in patent application FR 2 818 421. However, it is then difficult to integrate several honeycomb layers on the outside surface of the plug, due to the necessary size of such an assembly. Furthermore, it is also difficult to adapt the shape of the honeycomb structure to the high curvature of the outside face of the plug while maintaining good acoustic efficiency.

Concerning low frequency treatment, production of a Helmholtz resonator type device is disclosed in the document entitled "Folding Cavity Acoustic Liner for Combustion Noise Reduction" (Jia Yu and Eugene Chien, 12th AIAA/CEAS Aeroacoustics Conference (27th AIAA Aeroacoustics Conference) May 8-10 2006, Cambridge Mass.). This device that processes low frequencies, for example frequencies of the order of 400 Hz, does not handle high frequencies.

The device according to the invention does not have the disadvantages mentioned above Particularly advantageously, the device according to the invention can attenuate noise over a wide range of high frequencies. The noise attenuation device according to the invention can be associated with a Helmholtz resonator type attenuation device like that described in the document by Jia Yu and Eugene Chien mentioned above, and can advantageously attenuate noise over a wide range of frequencies varying from low to high frequencies.

PRESENTATION OF THE INVENTION

The invention relates to an acoustic treatment device for the internal structure of a primary ejection duct of a turbojet nacelle, the structure comprising an upstream zone and a downstream zone relative to an airflow direction in the primary ejection duct, the upstream zone having a perforated outside wall to allow acoustic waves to enter and the downstream zone having a solid outside wall, the upstream and downstream zones being located on opposite sides of a separating wall with a first face on the side of the upstream zone and a second face on the side of the downstream zone, characterised in that the device is composed of a micro-porosity of the separating wall and a honeycomb structure to attenuate high frequency acoustic waves that cover the face of the separating wall in the downstream zone.

According to another characteristic of the invention, the honeycomb structure is composed of at least one cellular layer and the cellular layer furthest from the separating wall is covered by an acoustic reflector.

According to yet another characteristic of the invention, when the honeycomb structure comprises at least two layers of stacked cells, two adjacent layers of stacked cells are separated from each other by a septum.

According to yet another characteristic of the invention, the cells in the different cell layers have different thicknesses in different layers in order to attenuate acoustic waves from different frequency bands.

According to yet another characteristic of the invention, the honeycomb structure is made of a metal capable of resisting hot ejection temperatures.

According to yet another characteristic of the invention, the device comprises a perforation in the outside wall of the structure, an additional honeycomb structure capable of attenuating high frequency acoustic waves that covers an internal face of the outside wall and an acoustic reflector that covers the additional honeycomb structure, in the zone downstream from the structure.

According to yet another characteristic of the invention, the upstream zone comprises a plurality of Helmholtz resonators for attenuation of low frequency acoustic waves.

One of the means by which the device according to the invention is different from devices according to prior art is in the positioning of a honeycomb structure inside the plug. The presence of the honeycomb structure inside the plug over part of the flat transverse separation between two cavities that participate in the plug, has several advantages. Thus, apart from the ability to easily stack several honeycomb layers without any particular integration constraints, it is also possible to overcome the problem of shaping the honeycomb structure because the honeycomb is flat, and therefore its shape is naturally adapted to the flat shape of the transverse separation.

Furthermore, such an acoustic treatment can be combined with a treatment with a thin layer (honeycomb structure) like that mentioned above, thus increasing the attenuation of high frequency noise.

BRIEF DESCRIPTION OF THE FIGURES

Other characteristics and advantages of the invention will become clear after reading preferred embodiments with reference to the attached figures, among which.

The same references refer to the same elements in all figures.

DETAILED DESCRIPTION OF EMBODIMENTS OF THE INVENTION

Figure 1A:
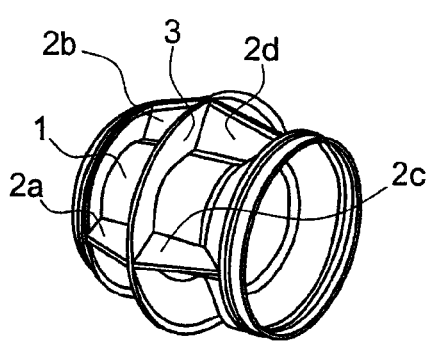
FIGS. 1A and 1B show a perspective view and a sectional view respectively of an internal structure of the primary ejection duct fitted with a noise treatment device according to the invention.
Figure 1B:
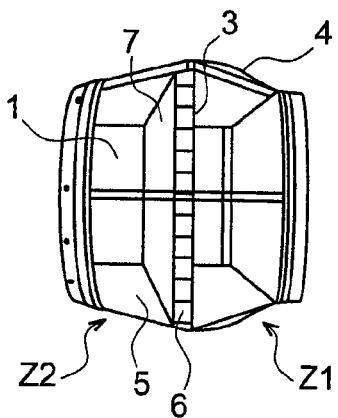

FIGS. 1A and 1B show a perspective view and a sectional view respectively of an internal structure of a primary ejection duct fitted with a noise treatment device according to the invention.

The internal structure of the primary ejection duct (plug) is a structure known in itself that will be briefly described below. FIG. 1A shows a perspective view of the structure without its outside walls and FIG. 1B shows a longitudinal sectional view of the structure with its outside walls.

The structure comprises a central body 1 that opens up in the form of funnel at one of its ends, a transverse separating wall 3 and longitudinal separating walls 2a, 2b, 2c, 2d, etc. on each side of the transverse separating wall 3. The transverse separating wall 3 separates the plug into an upstream zone Z1 and a downstream zone Z2, defined relative to the direction of the airflow circulating in the ejection circuit. The upstream zone is located on the funnel side of the central body 1 and the downstream zone is on the other side. There are four longitudinal separating walls in the upstream zone, and four in the downstream zone. They are arranged at 90° from each other around the central body 1. The longitudinal separating walls in the upstream zone are on line with the longitudinal separating walls in the downstream zone.

On the upstream zone side Z1, a perforated wall 4 closes the space located between the transverse separating wall 3 and the part of the central body 1 that is terminated as a funnel. The perforation ratio of the wall 4 may for example be equal to 15%. The four longitudinal walls located between the transverse wall 3 and the funnel 1 then form four cavities with the wall 4.

Similarly, a solid wall 5 on the side of the downstream zone Z2 closes the space located between the transverse separating wall 3 and the part of the central body 1, one end of which is located on the opposite side of the funnel, the four longitudinal walls located between the transverse wall 3 and the part of the central body located opposite the funnel defining four cavities with the wall 5.

In the framework of the invention, the transverse wall 3, more commonly called the septum, is a micro-porous wall in which holes are drilled with a diameter that may for example be equal to a few tenths of a millimetre. The perforation ratio of the transverse wall 3 may for example be equal to 5%. The thickness of the transverse wall may for example be equal to a few tenths of a millimetre.

As mentioned above, the wall 4 of the plug is preferably perforated. Acoustic waves then enter into the plug through the wall 4. The longitudinal separators that divide the inside of the plug into several cavities then prevent transverse propagation of low frequency acoustic waves. The cavities, in which one wall is perforated with holes, thus form Helmholtz resonators that attenuate low frequency noise. The frequency of attenuated noise depends on the size of the cavities (as a non-limitative example, a cavity with a side dimension of about 20 cm attenuates frequencies of about 500 Hz).

On the downstream side, the transverse wall 3 is covered with a honeycomb structure 6. The honeycomb structure 6 is actually composed of four elementary honeycomb structures separated by the longitudinal walls. For reasons of convenience, we will talk about "the" honeycomb structure 6 in the remaining description, knowing that it is actually composed of N elementary honeycomb structures, where N is the number of longitudinal separating walls.

The function of the honeycomb structure 6 is to attenuate high frequencies (for example frequency range varying from 4000 Hz to 5000 Hz). The honeycomb structure 6 is composed of a plurality of small cells. "Small" means cells for example with a side dimension of about 1 cm. The honeycomb structure may be a structure with a Single Degree Of Freedom (SDOF), 2 degrees of freedom (Double Degree Of Freedom—DDOF) structure, or more generally with M degrees of freedom (Multiple Degree Of Freedom—MDOF), where M is an integer larger than 2.

Figure 2A:
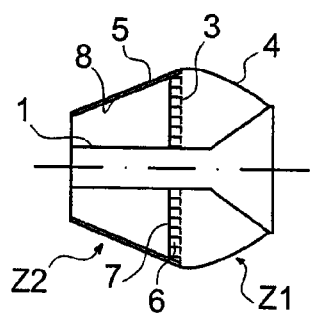
FIGS. 2A and 2B show sectional views of two variants of an internal structure of a primary ejection duct fitted with a noise treatment device according to a first embodiment of the invention.
Figure 2B:
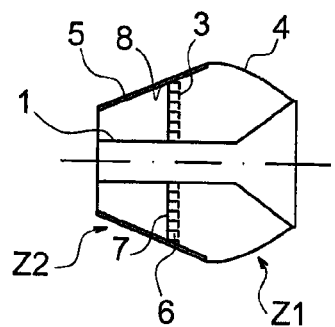
Figure 3:
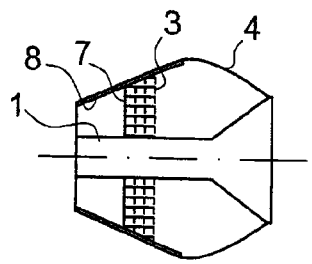
FIG. 3 shows a sectional view of an internal structure of a primary ejection duct fitted with a noise treatment device according to a second embodiment of the invention.

The honeycomb structure avoids the transverse propagation of high frequency acoustic waves. An SDOF honeycomb structure comprises a single layer of cells while a DDOF honeycomb structure is composed of a stack of two layers of cells and an MDOF honeycomb structure is composed of a stack of M layers of cells, where M is an integer number greater than 2. When the honeycomb structure is composed of at least two layers of stacked cells, two adjacent layers of cells are separated by a septum like that formed by the transverse wall 3. In all cases, the layer or stack of layers is closed by a rigid non-perforated plate 7 located on the opposite side of the transverse wall 3 and that acts as an acoustic reflector. As a non-limitative example, FIGS. 1B, 2A and 2B show an honeycomb structure with a single layer and FIG. 3 shows an honeycomb structure with three layers.

Structures with several layers can advantageously attenuate several frequency bands at the same time, each honeycomb layer attenuating a frequency band depending on its thickness.

The different septums that separate the different honeycomb, the different honeycomb layers and the rear reflector 7 are assembled in the form of a single piece before being inserted into the plug. They are made from a metal capable of resisting hot ejection temperatures. They are brazed to each other to make acoustic treatment plates (SDOF, DDOF or MDOF). Only the septum 3 is not assembled with the other elements, because it is the transverse separator of the plug. Once the parts that make up a honeycomb have been assembled, the honeycomb is mounted inside the plug: the face opposite the reflector 7 is brazed on the septum 3 and the lateral ends of the honeycomb are brazed to the longitudinal separators.

Making the honeycomb structure inside the plug in contact with the transverse wall 3 advantageously results in a structure with no high stresses over its total height. Advantageously, the septum 3 may also be made at different locations in the plug, thus making it possible to modify the dimensions of Helmholtz resonators. FIG. 2A shows a first example position of the septum 3 and FIG. 2B shows a second example position for which the Helmholtz resonators have a greater volume than in the first example, thus allowing attenuation of lower frequency noise.

In all embodiments, it is also possible to place a thin honeycomb treatment layer 8 on the downstream side of the inside surface of the outside wall, as shown for example in FIGS. 2A, 2B and 3. In this case, the outside wall is perforated and an acoustic reflector covers the honeycomb structure, which closes the structure between the transverse wall 3 and the central body 1. This advantageously increases the attenuation of high frequency noise.

A honeycomb structure with a single layer forms a quarter wave resonator for high frequencies, provided that a suitable choice is made for its height (for example a height of the order of 1 to 2 cm for frequencies between 4000 and 5000 Hz). In other embodiments in which the honeycomb comprises several layers, the fact of having several layers with different heights helps to attenuate noise at different frequencies due to the same resonance phenomenon.

The invention claimed is:

1. An acoustic treatment device for an internal structure of a primary ejection duct from a turbojet pad, comprising:
   an upstream zone and a downstream zone relative to an airflow direction in the primary ejection duct, the upstream zone including a perforated outside wall to allow acoustic waves to enter and the downstream zone including a solid outside wall, the upstream and downstream zones being located on each side of a separating wall with a first face on the side of the upstream zone and a second face on the side of the downstream zone, wherein the separating wall has a perforation ratio of fifteen percent or less, and a micro-porosity of the separating wall and a honeycomb structure attenuate high frequency acoustic waves that cover the face of the separating wall in the downstream zone.

2. A device according to claim 1, in which the honeycomb structure comprises at least one cellular layer and the cellular layer furthest from the separating wall is covered by an acoustic reflector.

3. A device according to claim 2, in which the honeycomb structure comprises at least two layers of stacked cells, and two adjacent layers of stacked cells are separated from each other by a micro-porous separating wall like the separating wall which separates the upstream zone and the downstream zone.

4. A device according to claim 3, in which the cells in the different cell layers have different thicknesses in different layers to attenuate acoustic waves from different frequency bands.

5. A device according to claim 1, in which the honeycomb structure is made of a metal capable of resisting hot ejection temperatures.

6. A device according to claim 1, further comprising:
a perforation in the outside wall of the structure;
an additional honeycomb structure capable of attenuating high frequency acoustic waves, and that covers an internal face of the outside wall; and
an acoustic reflector that covers the additional honeycomb structure, in the zone downstream from the structure.

7. A device according to claim 1, in which the upstream zone comprises a plurality of Helmholtz resonators for attenuation of low frequency acoustic waves.

8. A device according to claim 1, wherein the perforation ratio of the separating wall is five percent.

9. A device according to claim 1, wherein the perforation ratio of the separating wall is fifteen percent.

10. A device according to claim 1, wherein the perforation ratio of the separating wall is approximately five percent.

11. A device according to claim 1, wherein the perforation ratio of the separating wall is approximately fifteen percent.

* * * * *